(12) United States Patent
Koren et al.

(10) Patent No.: US 8,910,202 B2
(45) Date of Patent: Dec. 9, 2014

(54) MODIFICATION AND DISTRIBUTION OF VIDEO CONTENT

(75) Inventors: Noam Koren, Haniel (IL); Shai Bard, Zichron-Yaakov (IL); Eyal Nitzany, Tel-Aviv (IL)

(73) Assignee: Harmonic, Inc., San Jose, CA (US)

( * ) Notice: Subject to any disclaimer, the term of this patent is extended or adjusted under 35 U.S.C. 154(b) by 650 days.

(21) Appl. No.: 12/868,119

(22) Filed: Aug. 25, 2010

(65) Prior Publication Data
US 2011/0138414 A1 Jun. 9, 2011

Related U.S. Application Data

(60) Provisional application No. 61/267,775, filed on Dec. 8, 2009.

(51) Int. Cl.
| H04N 7/10 | (2006.01) |
| H04N 7/025 | (2006.01) |
| H04N 21/81 | (2011.01) |
| H04N 21/234 | (2011.01) |
| H04N 21/236 | (2011.01) |
| H04N 21/242 | (2011.01) |
| H04N 21/858 | (2011.01) |

(52) U.S. Cl.
CPC ....... *H04N 21/812* (2013.01); *H04N 21/23424* (2013.01); *H04N 21/23611* (2013.01); *H04N 21/242* (2013.01); *H04N 21/858* (2013.01)
USPC ............... 725/36; 725/32; 725/33; 725/34; 725/35

(58) Field of Classification Search
CPC .......... H04N 21/812; H04N 21/23424; H04N 21/23611; H04N 21/242
USPC ...................................... 725/35–36
See application file for complete search history.

(56) References Cited

U.S. PATENT DOCUMENTS

| 6,950,623 | B2 * | 9/2005 | Brown et al. ............... 455/3.01 |
| 7,269,836 | B2 * | 9/2007 | Nogima et al. .............. 725/32 |
| 2002/0068525 | A1 | 6/2002 | Brown et al. |
| 2003/0079222 | A1 * | 4/2003 | Boykin et al. ............... 725/31 |
| 2004/0244035 | A1 * | 12/2004 | Wright et al. ............... 725/32 |
| 2006/0107302 | A1 | 5/2006 | Zdepski |
| 2008/0052741 | A1 * | 2/2008 | Dharmaji ..................... 725/32 |
| 2009/0217318 | A1 * | 8/2009 | VerSteeg et al. ............. 725/32 |
| 2010/0122282 | A1 * | 5/2010 | DuBose ....................... 725/32 |

* cited by examiner

*Primary Examiner* — Pankaj Kumar
*Assistant Examiner* — Alazar Tilahun
(74) *Attorney, Agent, or Firm* — Brokaw Patent Law PC; Christopher J. Brokaw (57) ABSTRACT

A data stream processing system receives a transport stream containing single/multiple program/s and receives alternate content. The system identifies portions of the transport stream to replace with the alternate content. An alternate content data stream is generated that includes the alternate content and at least one sync packet. The sync packet enables synchronous replacement of the alternate content into the transport stream. The system then distributes the alternate content data stream.

20 Claims, 7 Drawing Sheets

MPTS PACKET 1 | MPTS PACKET 2 | MPTS PACKET 3 | MPTS PACKET 4 | MPTS PACKET 5 | ...

FIG. 7B

SYNC PACKET | MPTS PACKET 1 | MPTS PACKET 2 | MPTS PACKET 3 | MPTS PACKET 4 | SYNC PACKET | MPTS PACKET 5 | ...

MODIFICATION AND DISTRIBUTION OF VIDEO CONTENT

RELATED APPLICATIONS

This application claims the benefit of U.S. Provisional Application No. 61/267,775, filed Dec. 8, 2009, the disclosure of which is incorporated by reference herein.

BACKGROUND

Various data communication systems and networks are used to distribute content to users. These communication systems and networks include satellite systems and networks, cable distribution systems and networks, and terrestrial broadcast systems and networks. Content includes video data (such as television programs, movies and advertisements), audio data and various other types of data communicated to one or more users.

In many content distribution systems, users are requesting additional content, such as content that is specifically targeted to interests of groups of users. To meet these requests, content providers are seeking new content and new services that are of interest to users. For example, certain content providers desire to provide video content and advertisements that are targeted to users in a particular geographic region. In many situations, content providers want to provide this targeted content along with other "non-targeted" content being provided across a larger geographic region (e.g., nationwide).

One approach to providing targeted content in a particular geographic region includes replacing content on one or more nationwide channels with alternate content that is targeted to the particular geographic region in which the content is distributed. Different alternate content is inserted depending on the users to which the content is distributed.

Many content distribution systems utilize a combination of satellite data communication and terrestrial broadcast of data to users. Changing or replacing content in these content distribution systems requires proper handling of details such as synchronizing various data communication signals, properly removing existing content and inserting alternate content into the data stream.

Therefore, it is desirable to provide a content distribution system and method that allows content providers to replace content with alternate content targeted to a particular group of users.

BRIEF DESCRIPTION OF THE DRAWINGS

Throughout the description, similar reference numbers may be used to identify similar elements.

DETAILED DESCRIPTION

The systems and methods described herein relate to the replacement of existing content in a data stream with alternate content targeted to a particular group of users. In example implementations, content is distributed through satellites and/or data networks to one or more regional broadcast facilities. The regional broadcast facilities receive existing content (e.g., nationwide content) as well as region-specific content, and replace one or more of the programs in the existing content with the region-specific content. The data stream (including the inserted region-specific content) is then broadcast to multiple users within the region by terrestrial broadcast or other communication method.

Particular examples discussed herein process video content (including associated audio content) distributed to one or more geographic regions. In other embodiments, the systems and methods described herein are used with any type of data (or combination of multiple types of data) that is distributed in any manner. Specific embodiments communicate data in a constant bit rate (CBR) mode. CBR is an encoding method that communicates data at a fixed rate. Other embodiments may communicate data using other encoding methods, such as a variable bit rate (VBR) encoding method.

Figure 1:
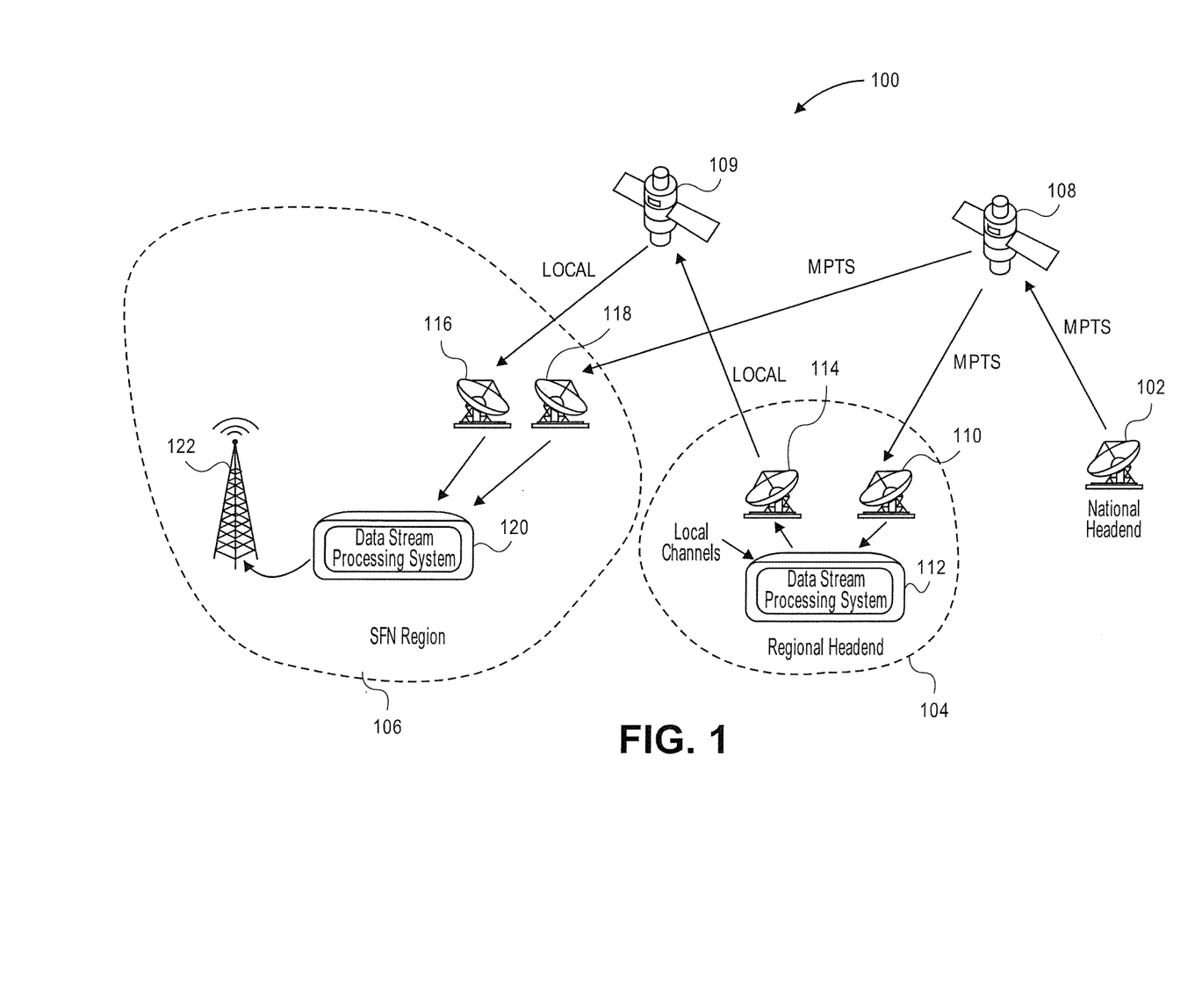
FIG. 1 illustrates an example content distribution environment capable of implementing the systems and methods described herein.

FIG. 1 illustrates an example content distribution environment 100 capable of implementing the systems and methods described herein. Environment 100 includes a national headend satellite transmitter 102 that communicates MPTS (multiple program transport stream) data to a satellite 108. MPTS is a transport stream that supports communication of multiple program content or program services. The MPTS data communicated by national headend satellite transmitter 102 is intended for distribution across multiple regions, such as nationwide distribution. This MPTS data typically includes content that is not targeted to users in a specific region and, instead, is of interest to all users across a large geographic area.

Satellite 108 communicates the MPTS data to a regional headend 104 and a single frequency network (SFN) region 106. Although a single regional headend 104 and a single SFN region 106 are shown in example environment 100, typical environments include multiple regional headends 104 and multiple SFN regions 106. Regional headend 104 operates to distribute content within a particular geographic region. As discussed herein, regional headend 104 communicates content to multiple SFN regions 106 within the geographic region. Thus, the regional area associated with regional headend 104 is typically divided into multiple SFN regions 106. Each SFN region 106 is a geographic region in which a broadcast network of one or more transmission towers 122 transmit the same signal using the same frequency channel. Although one transmission tower 122 is shown in FIG. 1, particular implementations may include any number of transmission towers within SFN region 106. Additional details regarding the transmission of signals within SFN 106 are discussed herein.

Regional headend 104 includes a satellite receiver 110, a data stream processing system 112, and a satellite transmitter 114. Satellite receiver 110 receives the MPTS data from satellite 108 and communicates the MPTS data to data stream processing system 112, which also receives local channel content. The local channel content is associated with local content specifically targeted to users in the region served by regional headend 104. Although not shown in FIG. 1, data stream processing system 112 may also receive other non-channel content that is targeted to users in the region served by regional headend 104, such as advertisements for products or services associated with businesses located in that region.

Data stream processing system 112 receives the local channel content and processes the content for future insertion into the MPTS data in SFN region 106. This processing of the local channel content is discussed below. In one embodiment, data stream processing system 112 may then communicate the processed local channel content to satellite transmitter 114, which transmits the processed local channel content to a satellite 109. Satellite 109 communicates the processed local channel content to a satellite receiver 116 in SFN region 106. A single satellite receiver 116 is shown in FIG. 1. However, in typical implementations, satellite 109 communicates the processed local channel content to multiple satellite receivers 116 located throughout SFN region 106. In other embodiments, the data processing system may operate in other transmission networks. The system is not limited to satellite distribution in particular, but may be used in broader applications, other transmission networks, and other systems where this functionality is useful.

Within SFN region 106, a satellite receiver 118 receives the MPTS data from satellite 108, and communicates the received MPTS data to a data stream processing system 120. Satellite receiver 116 communicates the received local channel content to data stream processing system 120, which replaces a portion of the MPTS data content with the local channel content. Data stream processing system 120 then communicates the data content (i.e., the MPTS data content modified with the local channel content) to transmission tower 122 for terrestrial broadcast to users in SFN region 106. As mentioned above, SFN region 106 typically includes more than two transmission towers located throughout the SFN region.

In a particular implementation, data stream processing systems 112 and 120 are "ProStream™ 1000" stream processing platforms available from Harmonic Inc. of Sunnyvale, Calif.

Figure 2:
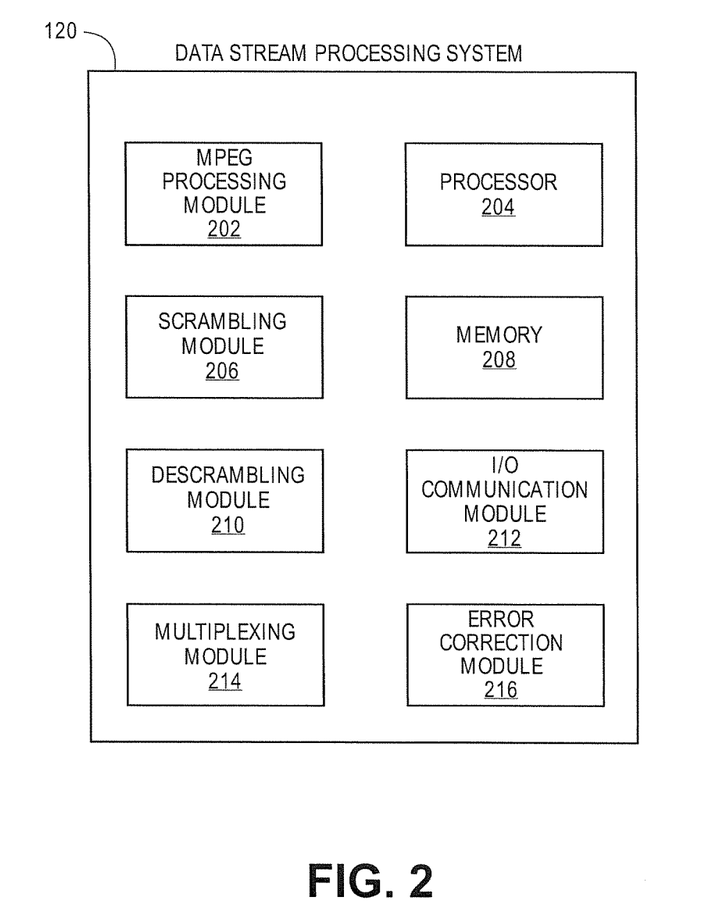
FIG. 2 illustrates an example data stream processing system.

FIG. 2 illustrates an example data stream processing system 120, which includes a processor 204, a memory 208, and an I/O communication module 212. Processor 204 executes various instructions to implement the functionality provided by data stream processing system 120, as described herein. Memory 208 stores these instructions as well as other data used by processor 204 and other components contained in data stream processing system 120. I/O communication module 212 allows data stream processing system 120 to communicate with other systems and devices, such as satellite receivers, transmission towers, other data stream processing systems, sources of content, and so forth.

Data stream processing system 120 also includes an MPEG (moving pictures experts group) processing module 202 that is capable of processing one or more MPEG data streams. For example, MPEG processing module 202 may encode data and decode data using one or more MPEG encoding/decoding formats. A particular embodiment of data stream processing system 120 includes a scrambling module 206 and a descrambling module 210. These two modules are used to scramble and descramble various data received by and/or processed by the data stream processing system using various data scrambling algorithms. A multiplexing module 214 multiplexes any number of data sets or data groups for communication across one or more communication links. Multiplexing module 214 is also capable of de-multiplexing data received by data stream processing system 120. An error correction module 216 performs various error-handling procedures associated with data processed by the data stream processing system.

Figure 3:
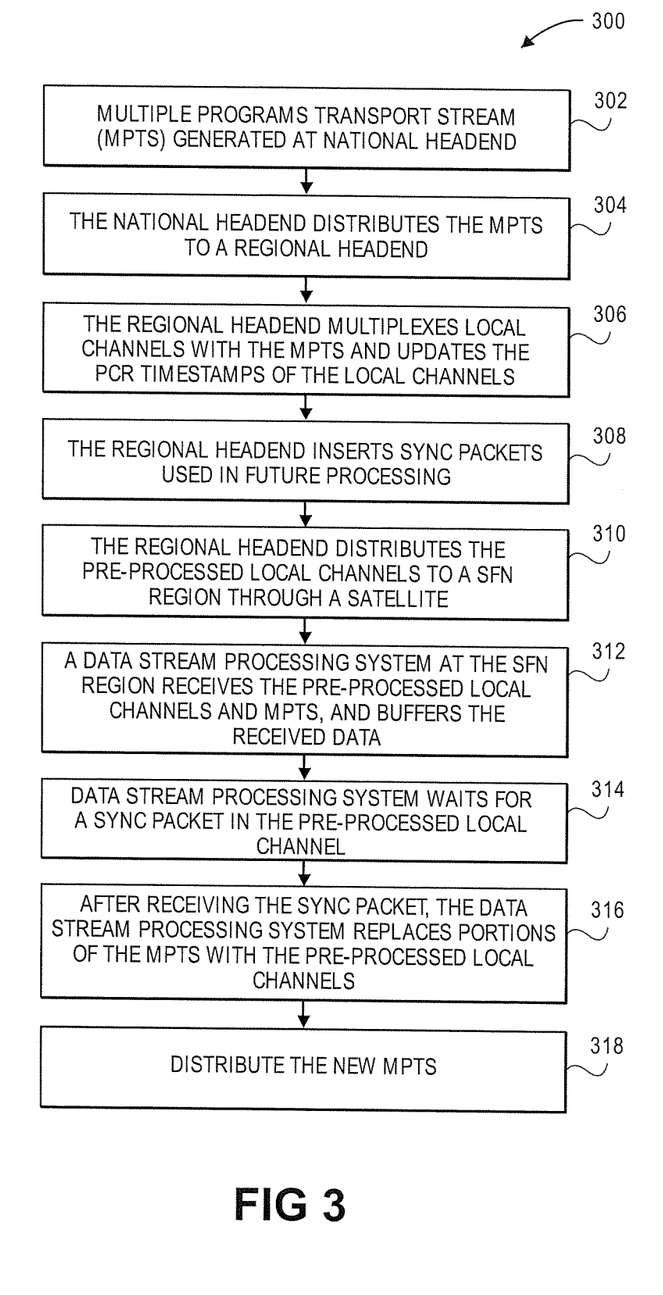
FIG. 3 is a flow diagram illustrating an embodiment of a procedure for preparing a portion of existing content in a data stream to be replaced at a future time with alternate content targeted to a particular group of users.

FIG. 3 is a flow diagram illustrating an embodiment of a procedure 300 for preparing a portion of existing content in a data stream to be replaced at a future time with alternate content targeted to a particular group of users. Initially, MPTS data is generated at the national headend (block 302). The MPTS data includes MIP (megaframe initialization packet) packets that contain synchronization and transmission information associated with the MPTS data. The national headend then distributes the MPTS data to a regional headend (block 304). In the example of FIG. 1, national headend 102 distributes the MPTS data via satellite to one or more regional headends 104. Alternatively, the MPTS data can be distributed to the regional headend using any communication protocol and using any communication medium.

After receiving the MPTS data, the regional headend multiplexes one or more local channels (or other content) with the MPTS data and updates PCR (program clock reference) timestamps associated with the local channels (block 306). In a particular embodiment, the PCR timestamp is updated by adding the time delay introduced to the packet containing the PCR due to its multiplexing into the MPTS. When processing the local channel content, the regional headend also inserts sync packets that are later used in the SFN region to multiplex the local channel content with the MPTS data (block 308). Specific information may include specific MIP number, time stamp, serial number, etc The regional headend also inserts null packets in the data stream to adapt the rate of the inserted local channel(s) to the rate of the removed channel(s) which is higher by definition. When inserting these null packets, an algorithm seeks to place a local channel packet instead of national channel packet that was removed. When a local channel packet cannot be found in the buffer due to the inserted channel(s) rate which is lower, a special null packet is inserted instead.

After processing the local channel content (the "pre-processed local channels"), the regional headend distributes the pre-processed local channels to a SFN region through a satellite (block 310). A data stream processing system at the SFN region receives the pre-processed local channels and the MPTS data, and buffers the received data upon arrival of a specific MIP packet (block 312). The MIP packet is used for synchronization. In a particular embodiment, the MIP packet contains data related to a sync point for insertion. Not all MIP packets must used as sync-point in the MPTS. MIP packets with specific values associated with their continuity counter field are selected. The specific value to use should be determined by the operator. the value itself has no significance, as long as all the relevant MIPs possess a similar value. Also, this system will work well even if no "special" MIPs will be inserted. Instead one can use the MIPs that are already integrated into the stream. In this case, the relevant equipment (sender) should mark those MIPs packet, in a way that is agreed by the receiver device The data stream processing system then waits for a sync packet in the pre-processed local channel (block 314). After receiving the sync packet, the data stream processing system replaces portions of the MPTS data with the pre-processed local channels (block 316). Additional details regarding the replacement of the MPTS data are discussed below. Finally, the data stream processing system distributes the new MPTS, containing the replaced local channel content, to multiple users within the SFN region.

The systems and methods described herein allow the regional headend to handle the processing of the local channel content without actually inserting the local channel content into the MPTS data. Instead, the local channel content is "pre-processed" at the regional headend and the actual insertion of the local channel content into the MPTS data occurs at the SFN region. Thus, the regional headend does not re-transmit the MPTS data to the SFN region. Instead, the SFN region receives the MPTS data via satellite from the national headend and receives the pre-processed local channel content via satellite from the regional headend. This simplifies the processing required at the SFN region and reduces uplink bandwidth required at the regional headend by avoiding re-transmission of the MPTS data from the regional headend to the SFN region.

Figure 4:
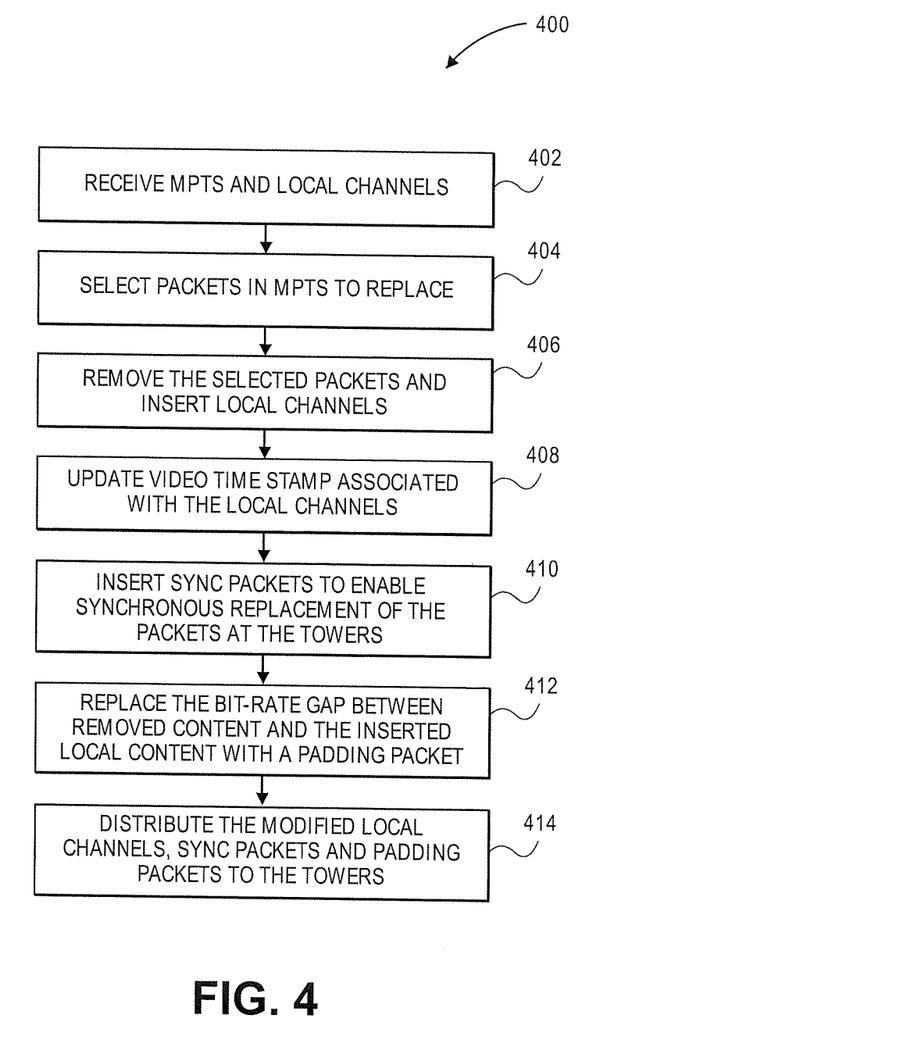
FIG. 4 is a flow diagram illustrating an embodiment of a procedure performed at a regional headend to replace existing content in a data stream with alternate content.

FIG. 4 is a flow diagram illustrating an embodiment of a procedure 400 performed at a regional headend to replace existing content in a data stream with alternate content. Initially, the regional headend receives the MPTS data and the local channel content (block 402). As shown in FIG. 1, the MPTS data may be received from one source (satellite 108) and the local channel content from another source (satellite 109). Procedure 400 continues by selecting packets in the MPTS to replace with local channel content (block 404). The packets to be replaced are selected according to their PID (packet identifier). This PID may preconfigured by the operator. Also, multiple PIDs could be configured within a program. In other embodiments, multiple PIDs may be configured or preconfigured by the operator or other source. The selected packets are then removed from the MPTS data stream and the appropriate local channel content is inserted (block 406). Removal of the selected packets from the MPTS data stream is based on their PID. The PIDs for the local channel content can be obtained from the original local content transport stream. The local channel packets are multiplexed into the MPTS data stream instead of the original MPTS data. When inserting the local channel content, the systems and methods verify that the aggregated bit rate of the local channel content is less than the replaced MPTS data.

The procedure of FIG. 4 continues by updating a video time stamp associated with the local channel content (block 408). The video time stamp is modified according to the delay of the packet in the system. Different PCR packets undergo different delays from input to output. Adding that value (delay) makes the time stamp reflect the correct emission time for the packet. Next, the procedure inserts sync packets to enable synchronous replacement of the packets at the SFN region (block 410). These sync packets provide synchronization points in the local data stream to enable synchronous replacement of MPTS packets with local channel content. This replacement occurs at the SFN region, but the sync packets are inserted at the regional headend. The sync packets instruct the data stream processing system at the SFN region from what point in the local channel content to begin retrieving the replacement content.

The MPTS data includes MIP packets, such that each megaframe includes an MIP packet. Some MIP packets are synchronization entry points for the MPTS data. Each time a relevant MIP packet is detected, a sync packet is transmitted to the SFN region via the local channel content stream. Each sync packet is associated with a particular MIP packet. The sync packets can be used also for transmission of in-band configuration information to the SFN region. For instance, "starting" bit-rate value can be transmitted through this channel.

Procedure 400 continues by replacing the bit rate gap between the content removed from the MPTS data stream and the inserted local content with a padding packet (block 412). Since the inserted local content generally has a bit rate that is less than the MPTS data stream, the procedure inserts null packets to fill the gap created by the slower bit rate. In one implementation, these null packets are referred to as "colored null" since they are later replaced by real null packets (of PID 0x1FFF) in the SFN region. These "colored null" packets have a predefined PID. Finally, the procedure distributes the modified local channels, sync packets, and "colored null" packets to the SFN region (block 414).

In a particular implementation of procedure 400, a data stream processing system receives the MPTS data and the local channel data and buffers the received data. The procedure then selects packets in the MPTS data for replacement according to a prior configuration, such as a specific program or PID. Next, the video time stamps (PCRs) are updated according to their "correct" position in the data stream (e.g., based on the position of the MPTS packets being replaced with local content). The procedure then inserts sync packets with specific PIDs in place of packets that were not used in the channel being replaced. In a particular embodiment, a single sync packet is inserted periodically instead of inserting a sync packet for every replaced packet. "Colored" null packets (also referred to as padding packets) are inserted in place of the remaining MPTS data packets that are to be replaced. Finally, the procedure distributes the local channel information (that will be inserted into the data stream during processing at the SFN region) and the sync packets to the SFN region(s).

Figure 5:
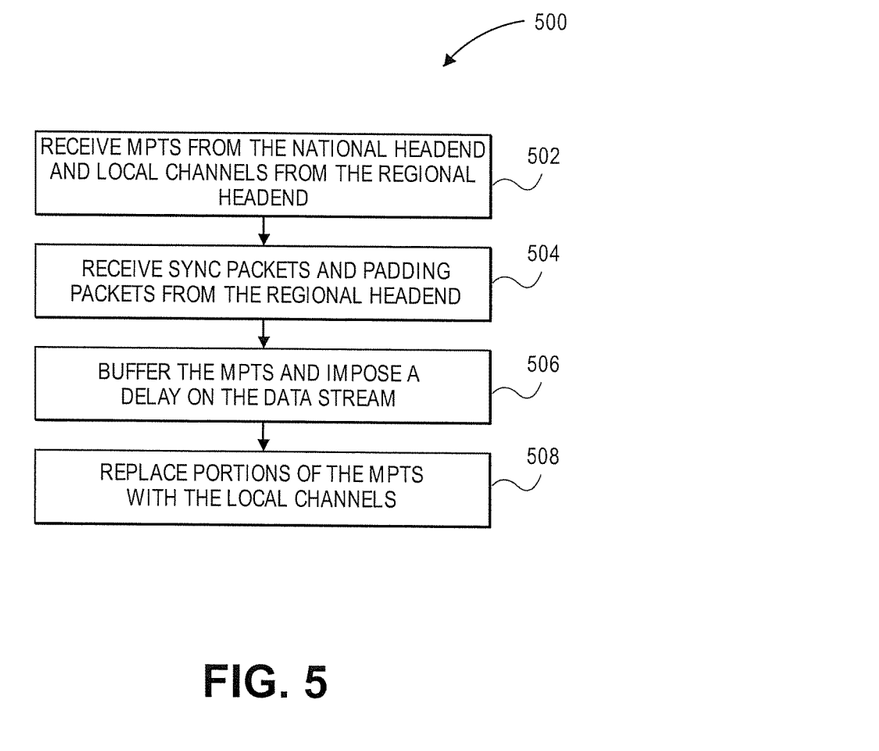
FIG. 5 is a flow diagram illustrating an embodiment of a procedure performed in a SFN region to distribute content to multiple users.

FIG. 5 is a flow diagram illustrating an embodiment of a procedure 500 performed in a SFN region to distribute content to multiple users. Initially, the procedure receives MPTS data from the national headend and local channel content from the regional headend (block 502). The procedure receives sync packets and padding packets (null packets), which may include colored and non-colored, with the local channel from the regional head end (block 504). As described above, the sync packets and padding packets are transmitted in the local channel content stream. The MPTS data stream is buffered and a delay is imposed on the MPTS data stream (block 506) to compensate for the time required to transmit the local channel content from the regional headend to the SFN region. Finally, the identified portions of the MPTS data are replaced with the local channel content (block 508).

Figure 6:
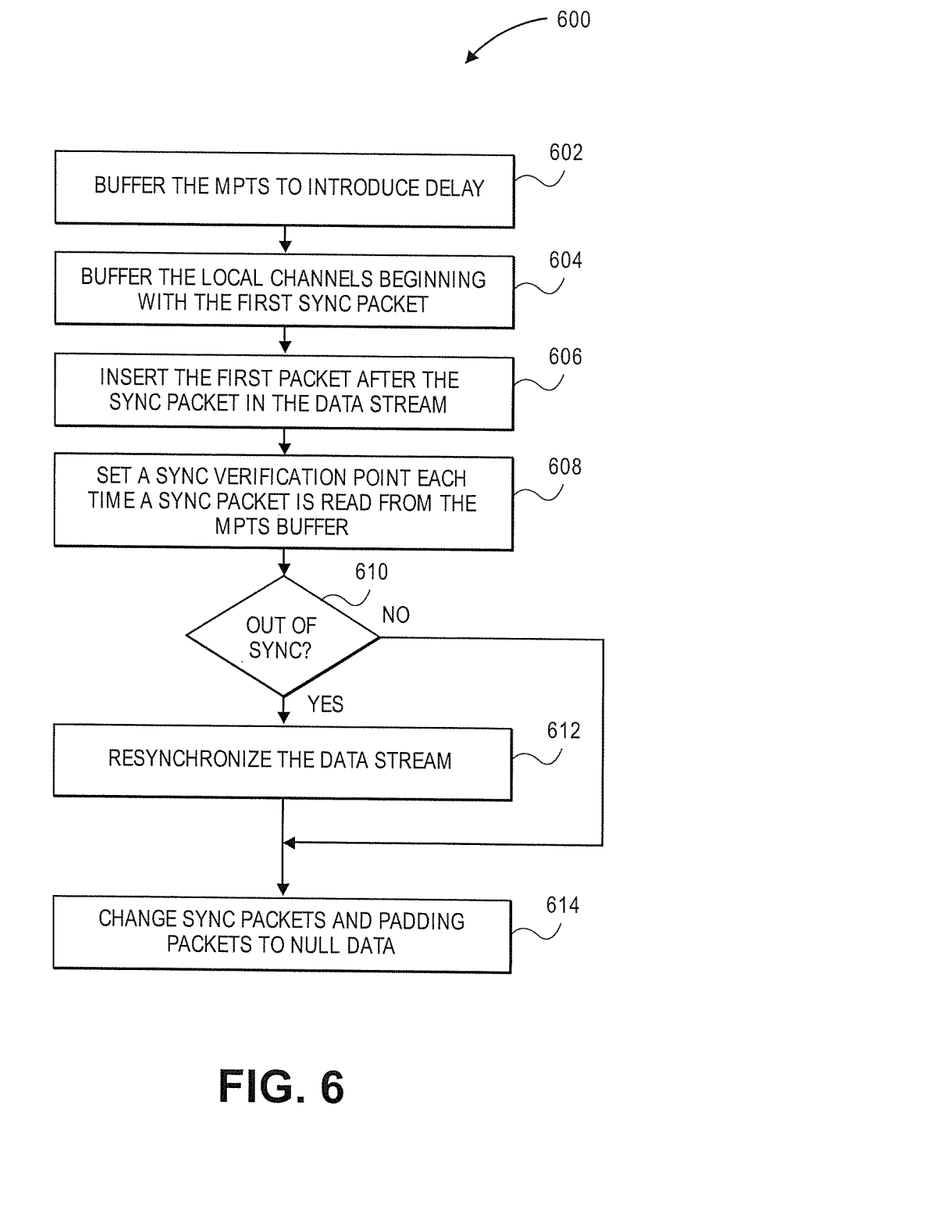
FIG. 6 is a flow diagram illustrating an embodiment of a procedure for managing content in a data stream.

FIG. 6 is a flow diagram illustrating an embodiment of a procedure 600 for managing content in a data stream. As discussed above, content replacement is performed at the SFN region, although preparations for the content replacement are performed at the regional headend. The replacement of content in the MPTS data stream follows the procedure of FIG. 6. Initially, the MPTS data stream is buffered to introduce a delay (block 602) that is larger than the transmission delay from the regional headend to the SFN region. The procedure also buffers the local channel content beginning with the first detected sync packet (block 604).

Procedure 600 continues by inserting the first packet after the sync packet in the data stream (block 606) being distributed throughout the SFN region right after the synchronization MIP packet in the MPTS. The sync packet itself is not inserted in the MPTS. A sync verification point is set each time a synchronization MIP is read from the MPTS buffer (block 608). If the first packet from the local channel content buffer is not a sync packet, then the process is out of sync (block 610). The process is re-synchronized (block 612). This re-synchronization can be implemented in various manners, such as clearing the MPTS buffer and the local channel content buffer, then re-starting the buffering process as discussed above. Finally, the procedure changes sync packets and padding packets (colored null packets) to "traditional" null packets (block 614) to avoid an unreferenced PID in the transport stream distributed throughout the SFN region.

As mentioned above, re-synchronization process may be implemented in several ways. For example, systems, which are prone to errors, out-of-sync event may occur very rapidly. In these cases, operators may consider to declare an out-of-sync event only if it happens more than three times in a role.

Since the regional headend pre-processed the local channel content, the processing in the SFN region is performed without requiring any data corrections or adjustments to data time stamps. The pre-processing of the local channel content eliminates the need for any complex calculations at the SFN region. Thus, the processing equipment at the SFN region needs reduced processing resources which typically reduces cost.

Since the regional headend pre-processed the local channel content, the data replacement in each of the towers of a specific SFN region can be deterministic. This is important because all towers should transmit the same sequence of data bits.

Figure 7A:
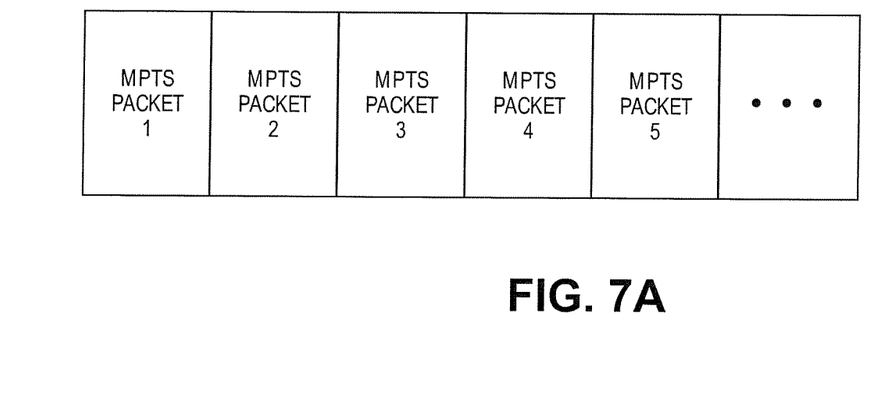
FIG. 7A illustrates an example data stream prior to insertion of alternate content.
Figure 7B:
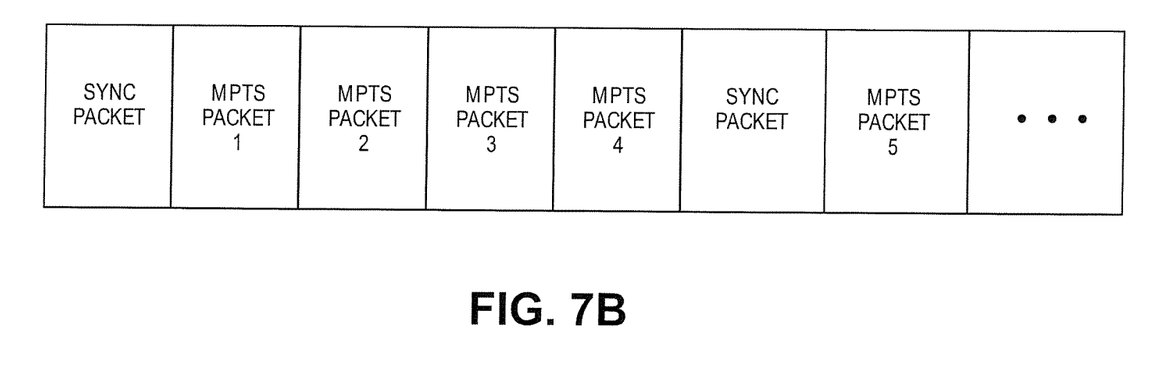
FIG. 7B illustrates the example data stream of FIG. 7A after insertion of multiple sync packets.

FIG. 7A illustrates an example data stream prior to insertion of alternate content. In this example, the data stream in FIG. 7A is a transport stream containing multiple programs intended for distribution to multiple geographic regions. The transport stream includes multiple MPTS packets. FIG. 7B illustrates the example data stream of FIG. 7A after insertion of multiple sync packets. As discussed above, the sync packets are used to indicate insertion points for alternate content, such as local content associated with a specific geographic region. In a particular embodiment, the sync packets are included in the data stream at regular intervals, such as every N packets. In alternate embodiments, the sync packets are included in the data stream at irregular intervals.

The invention may also involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the system and method described herein facilitate processing and communication of data. Additionally, some embodiments may be used in conjunction with one or more conventional data processing systems and methods. For example, one embodiment may be used as an improvement of existing data processing systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method, comprising:

at a regional headend, receiving a multiple program transport stream (MPTS) containing multiple programs;

at the regional headend, receiving an original alternate content stream simultaneously with the multiple program transport stream (MPTS);

at the regional headend, identifying portions of the multiple program transport stream (MPTS) to replace with the alternate content;

at the regional headend, updating a time stamp associated with the alternate content;

at the regional headend, generating an alternate content data stream including the original alternate content stream and at least one sync packet without actually inserting the multiple program transport stream (MPTS) into the alternate content data stream, wherein the sync packet enables synchronous replacement of the alternate content into the multiple program transport stream (MPTS), wherein generating the alternate content stream including inserting padding packets to the original alternate content stream effective to match a bit rate of the alternate content data stream to the multiple program transport stream (MPTS); and at the regional headend, distributing both the alternate content data stream and the multiple program transport stream (MPTS) to a receiving system of a single frequency network (SFN) region, the receiving system being operable to (a) receive both the alternate content data stream and the transport stream, (b) insert data from the alternate content data stream into the multiple program transport stream (MPTS) to obtain a combined stream, and (c) broadcast the combined stream over a distribution network.

2. The method of claim 1, wherein the multiple program transport stream (MPTS) includes video and audio programming associated with a plurality of geographic regions and the alternate content includes video and audio programming and data associated with one of the plurality of geographic regions.

3. The method of claim 1, wherein the alternate content is associated with a specific geographic region.

4. The method of claim 1, wherein the alternate content includes advertisements targeted to users in a specific geographic region.

5. The method of claim 1, wherein the alternate content includes advertisements targeted to users in a specific geographic region.

6. The method of claim 1, wherein the received multiple program transport stream (MPTS) includes a plurality of programs targeted to users in a plurality of geographic regions.

7. The method of claim 1, further comprising replacing, at the receiving system, the identified portions of the multiple program transport stream (MPTS) with the alternate content.

8. A method, comprising:
at a single frequency network (SFN) region, receiving, from a first transmission source, a multiple program transport stream (MPTS) containing multiple programs;
at the single frequency network (SFN) region, receiving an alternate content data stream containing alternate content and at least one sync packet, wherein the alternate content data stream is received from a second transmission source different from the first transmission source;
at the single frequency network (SFN) region, replacing portions of the multiple program transport stream (MPTS) with the alternate content to generate a modified transport stream, wherein replacing portions of the multiple program transport stream (MPTS) with the alternate content is based on the sync packet contained in the alternate content data stream;
at the single frequency network (SFN) region, distributing the modified transport stream to a plurality of users;
at the single frequency network (SFN) region, buffering the multiple program transport stream (MPTS) to compensate for an additional delay in receiving the alternate content data stream from the second transmission source; and
at the single frequency network (SFN) region, setting a synchronization verification point each time a sync packet is read from the buffered multiple program transport stream (MPTS).

9. The method of claim 8, wherein the plurality of users are located in a specific geographic region.

10. The method of claim 8, wherein the multiple program transport stream (MPTS) contains programs associated with a plurality of geographic regions and the alternate content data stream includes programs associated with one or the plurality of geographic regions.

11. The method of claim 8, wherein the alternate content includes advertisements targeted to users in a specific geographic region.

12. The method of claim 8, wherein the alternate content includes programs targeted to users in a specific geographic region.

13. The method of claim 8, further comprising buffering the alternate content data stream beginning with a first received sync packet in the alternate content data stream.

14. The method of claim 8, further comprising synchronizing the multiple program transport stream (MPTS) and the additional content prior to distributing the modified transport stream to a plurality of users.

15. The method of claim 8, further comprising re-synchronizing the inputs.

16. An apparatus, comprising:
a communication module, in communication with a single frequency network (SFN) tower, configured to receive a multiple program transport stream (MPTS) containing multiple programs and configured to receive alternate content; and
a processor coupled to the communication module and configured to identify portions of the multiple program transport stream (MPTS) to replace with portions of an alternate content stream and update a time stamp associated with the alternate content stream, wherein the processor is further configured to generate an alternate content data stream that includes the alternate content stream padded to match a bit rate of the multiple program transport stream (MPTS) and including a plurality of sync packets without actually inserting the multiple program transport stream (MPTS) into the alternate content data stream, wherein the plurality of sync packets enable synchronous replacement of the alternate content into the program transport stream (MPTS).

17. The apparatus of claim 16, wherein the communication module is further configured to distribute the alternate content data stream.

18. The apparatus of claim 16, further comprising an MPEG processing module configured to encode and decode MPEG data.

19. The apparatus of claim 16 wherein the alternate content is associated with a specific geographic region.

20. The apparatus of claim 16, wherein the multiple program transport stream (MPTS) is associated with a plurality of geographic regions and the alternate content is associated with one of the plurality of geographic regions.

* * * * *